US005591356A

United States Patent [19]

Sakuragi et al.

[11] Patent Number: 5,591,356

[45] Date of Patent: Jan. 7, 1997

[54] PLASMA TORCH HAVING CYLINDRICAL VELOCITY REDUCTION SPACE BETWEEN ELECTRODE END AND NOZZLE ORIFICE

[75] Inventors: Shunichi Sakuragi, Naka-gun; Naoya Tsurumaki, Hiratsuka, both of Japan

[73] Assignee: Kabushiki Kaisha Komatsu Seisakusho, Tokyo, Japan

[21] Appl. No.: 446,723

[22] PCT Filed: Nov. 22, 1993

[86] PCT No.: PCT/JP93/01706

§ 371 Date: May 30, 1995

§ 102(e) Date: May 30, 1995

[87] PCT Pub. No.: WO94/12308

PCT Pub. Date: Jun. 9, 1994

[30] Foreign Application Priority Data

Nov. 27, 1992 [JP] Japan .................................... 4-339490

[51] Int. Cl.$^6$ .................................................... B23K 10/00

[52] U.S. Cl. ................................. 219/121.5; 219/121.51; 219/75; 219/121.48

[58] Field of Search ............................ 219/121.5, 121.48, 219/121.39, 121.51, 121.52, 74, 75

[56] References Cited

U.S. PATENT DOCUMENTS

| | | | |
|---|---|---|---|
| 3,242,305 | 3/1966 | Kane et al. | 219/75 |
| 3,790,742 | 2/1974 | Auer | 219/121 P |
| 4,959,520 | 9/1990 | Okada et al. | 219/121.48 |
| 5,308,949 | 5/1994 | Reed, Jr. et al. | 219/121.5 |
| 5,444,209 | 8/1995 | Crawmer et al. | 219/121.52 |

FOREIGN PATENT DOCUMENTS

| | | |
|---|---|---|
| 0452494 | 10/1991 | European Pat. Off. . |
| 59-229282 | 12/1984 | Japan . |
| 2-175080 | 7/1990 | Japan . |
| 3-12399 | 2/1991 | Japan . |

*Primary Examiner*—Mark H. Paschall
*Attorney, Agent, or Firm*—Richards, Medlock & Andrews

[57] ABSTRACT

A plasma torch, capable of cutting in a dross free state, is made possible by increased energy density of the arc jet. The operation efficiency is not reduced even with a low operating gas flow rate, since the arc jet can be stably maintained in the plasma torch. The torch has a high double arc resistance and excellent durability. This is realized by forming a velocity reduction space N from near a lower end (3*b*) of the electrode (3) to a nozzle (9) at the front end of the plasma torch (1), the velocity reduction space being used for reducing the axial velocity component of the operating gas which flows along the outer periphery of an electrode (3). The velocity reduction space (N) is cylindrically shaped, and the diameter (Dd) of the cylindrical shape is larger than the diameter (da) of a lower end (3*b*) of the electrode (3). The velocity reduction space can be formed such that the diameter (Dd) of the cylindrical shape is larger than the diameter (da) of the lower end (3*b*) of the electrode and larger than the height (Ha) of the cylindrical shape. The energy density of the arc jet is greater than $4\times10^5$ A·S/kg.

18 Claims, 8 Drawing Sheets

PLASMA TORCH HAVING CYLINDRICAL VELOCITY REDUCTION SPACE BETWEEN ELECTRODE END AND NOZZLE ORIFICE

TECHNICAL FIELD

The present invention relates to a plasma torch, and, more particularly, to a plasma torch in which a transferred arc jet is produced to cut a workpiece.

BACKGROUND ART

Hitherto, there has been a demand for a plasma torch which is capable of cutting material, such as steel, stainless steel, etc., with high precision and without adherence of molten metal. (hereinafter referred to as dross), which has a narrow cutting width, which is even capable of cutting thick plates, and which has a long life. With regard to such prior art, one of the present applicants has proposed a transferred plasma torch, for example, in Japanese Utility Model Application No. 1-72919. For example, each of FIGS. 7 and 8 is a cross-sectional view of a nozzle and electrode section of a conventionally proposed transferred plasma torch, wherein swirling air currents are produced in the operating gas. In the transferred plasma torch 50 of FIG. 7, a switch 53 is operated to transfer the arc, formed between a nozzle 52 and an electrode member 51*a* of an electrode 51, to a workpiece 54 to be cut. In this plasma torch 50, a swirler member 55 is inserted near the electrode 51, disposed within the nozzle 52, and a plurality of holes 55*a* are obliquely formed downwardly therein. The operating gas, which has passed through the plurality of holes 55*a*, becomes swirling currents and is successively accelerated in an acceleration section 52*a*, formed into a V shape with a gentle inclination at the front end of the nozzle 52, and reaches a nozzle restriction section 52*b* for restricting the arc let 56 such that it moves in a straight line.

In plasma torch 60 of FIG. 8, a swirler member 63 is inserted near an electrode 62, disposed in nozzle 61, and a plurality of holes 63*a* are formed in the swirler member 63 perpendicular to axial center Z of the plasma torch 60 and tangential with respect to the inner peripheral face of the swirler member 63. At the front end of the nozzle 61 below the electrode 62, there is disposed a velocity reduction space 61*a* below and apart from the lower end of an electrode member 62*a* of the electrode 62. The operating gas, which has passed through the plurality of holes 63*a*, becomes swirling air currents; and in the velocity reduction space 61*a*, these swirling air currents allow arc jet 56 to be held in a low-pressure space formed in the center axis and therearound. Since the nozzle 61 has the velocity reduction space 61*a* at the upstream side, it is capable of preventing deflection of the arc jet 56 which is ejected from the nozzle restriction section 61*b*, so that it is generated with a high degree of straightness, which results in excellent cutting of the workpiece 54.

However, in such above-described conventional transferred plasma torches, when in conventional use a current is made to flow through an electrode and a conventional operating gas flow rate is supplied, it is extremely difficult to achieve cutting of a workpiece in a dross free state. This is thought to be very difficult to achieve even when the conditions are changed.

Another different prior art is known, in which cutting in a dross free state is achieved by a method which comprises cutting a workpiece by an arc jet having the operating oxygen gas further enveloped by an oxygen curtain during cutting (refer, for example, to Japanese Patent Laid-Open No. 59-229282). However, the use of oxygen for the curtain results in increased gas consumption as well as a reduced precision in the dimensions of the cut face or the like due to burning.

The present invention has been achieved to overcome the above-described problems of the prior art, and relates to a plasma torch and, more particularly, to a plasma torch in which a transferred arc jet is generated, wherein dross adhesion does not occur, the arc jet is stable, and the nozzle, etc., has a long life.

DISCLOSURE OF THE INVENTION

Accordingly to a first aspect of the present invention, there is provided a plasma torch having a velocity reduction space formed near the lower end of an electrode toward the nozzle at the front end of the plasma torch, the velocity reduction space being used for reducing the axial velocity component of the operating gas flowing along the outer periphery of the electrode. The velocity reduction space is cylindrical in shape, the cylindrical shape having a diameter greater than the diameter of the lower end of the electrode. The velocity reduction space can be formed such that the diameter of the cylindrical shape is larger than the diameter of the lower end of the electrode, and, at the same time, larger than its own height. Further, the operating gas, made into swirling currents by a swirler member, is caused to flow through a cylindrically-shaped annular entrance section, the entrance section being formed almost parallel to the outer periphery of the electrode, through a thin conically-shaped annular acceleration section, the acceleration section being formed at the tapered section of the electrode, through the velocity reduction space, through a conical acceleration Space, the conical acceleration space being formed below the velocity reduction space, and then through a restriction section within a cylindrical nozzle. The operation gas, formed into currents, is then ejected toward the workpiece.

With a construction wherein the velocity reduction space is formed near the lower end of the electrode, it is possible to maintain most of the arc jet within the plasma torch in the velocity reduction space, which results in increased stability of the arc jet in the plasma torch. In addition, since the diameter of the velocity reduction space is larger than the diameter of the lower end of the electrode, there is less fluctuation of the arc jet in the radial direction in the plasma torch, that is, the arc jet becomes more stable with less wandering. This means that the thickness of the gas insulation layer is increased in the radial direction, making it possible to prevent the occurrence of improper discharges, such as double arcs. Further, since the diameter of the cylindrical shape is larger than its height, the length in the axial direction of the arc jet, held in the velocity reduction space, becomes relatively small, making it possible to prevent kink instability, etc., when the arc jet is being extended. Still further, since the operating gas flows through the entrance section, the acceleration section, the velocity reduction space, the acceleration space, and the restriction section, it is possible to achieve smooth flow of the operating gas and to maintain the stability of the arc jet in the plasma torch at the same time.

According to a second aspect of the invention, there is provided a plasma torch in which an operating gas flows therein and is formed into swirling currents by a swirler member, the currents being caused to flow from the end of an electrode along the outer periphery of a tapered portion of the electrode toward a workpiece, and in which an arc is developed by the electrode and ejected as an arc jet from a nozzle at the front end of the plasma torch toward the workpiece. In this construction, the energy density of the arc jet is greater than $4\times10^5$ [(ampere×second)/kg]. In this case, the energy density I/m of the arc jet is defined as I/m [arc current value I (ampere)/operating gas flow rate m (kg/s)], and m will hereinafter represent the flow rate of the operating gas (in kg) per unit time (in seconds).

With such construction, steel and other materials can be cut by means of an arc jet with a high energy density, thereby making it possible to perform cutting in a dross free state.

According to a third aspect of the invention, there is provided a plasma torch having a swirler member with a plurality of ejection holes formed therein on a plane substantially perpendicular to the central axis of the plasma torch, the swirler member causing the generation of jets with only a swinging velocity component $V_\theta$in the tangential direction and the formation of operating gas into swirling currents. This plasma torch has a substantially cylindrically-shaped velocity reduction space, and has the following dimensions: $0\leqq Hd\leqq 7De$, $30°\leqq\phi\leqq 100°$, $90°\leqq\theta\leqq 150°$, $0.5De\leqq Ha\leqq 2.5De$, $4De\leqq Dd\leqq 10De$, $-0.4De\leqq Hb\leqq 0.6De$, and $2.5De\leqq Hc\leqq 4De$. Here, De represents the nozzle orifice diameter.

With a construction wherein the plasma torch has a velocity reduction space formed into a predetermined dimensional shape, it is possible to perform cutting in a dross free state, and, at the same time, a desired design can be realized.

BEST MODE FOR CARRYING OUT THE INVENTION

A description will be given of a preferred embodiment of the plasma torch of the present invention with reference to the attached drawings.

Figure 1A:
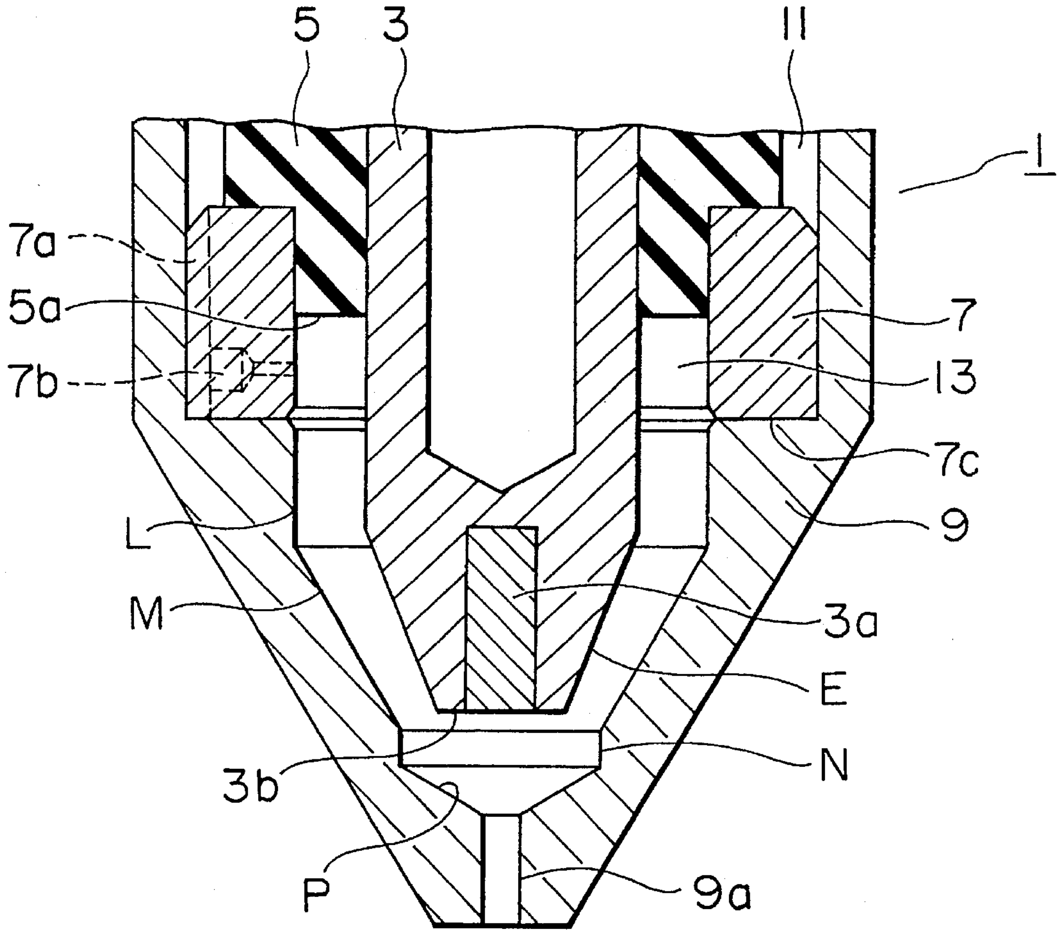
FIG. 1*a* is a cross-sectional view of the front end of a nozzle of the plasma torch in accordance with the present invention.
Figure 1B:
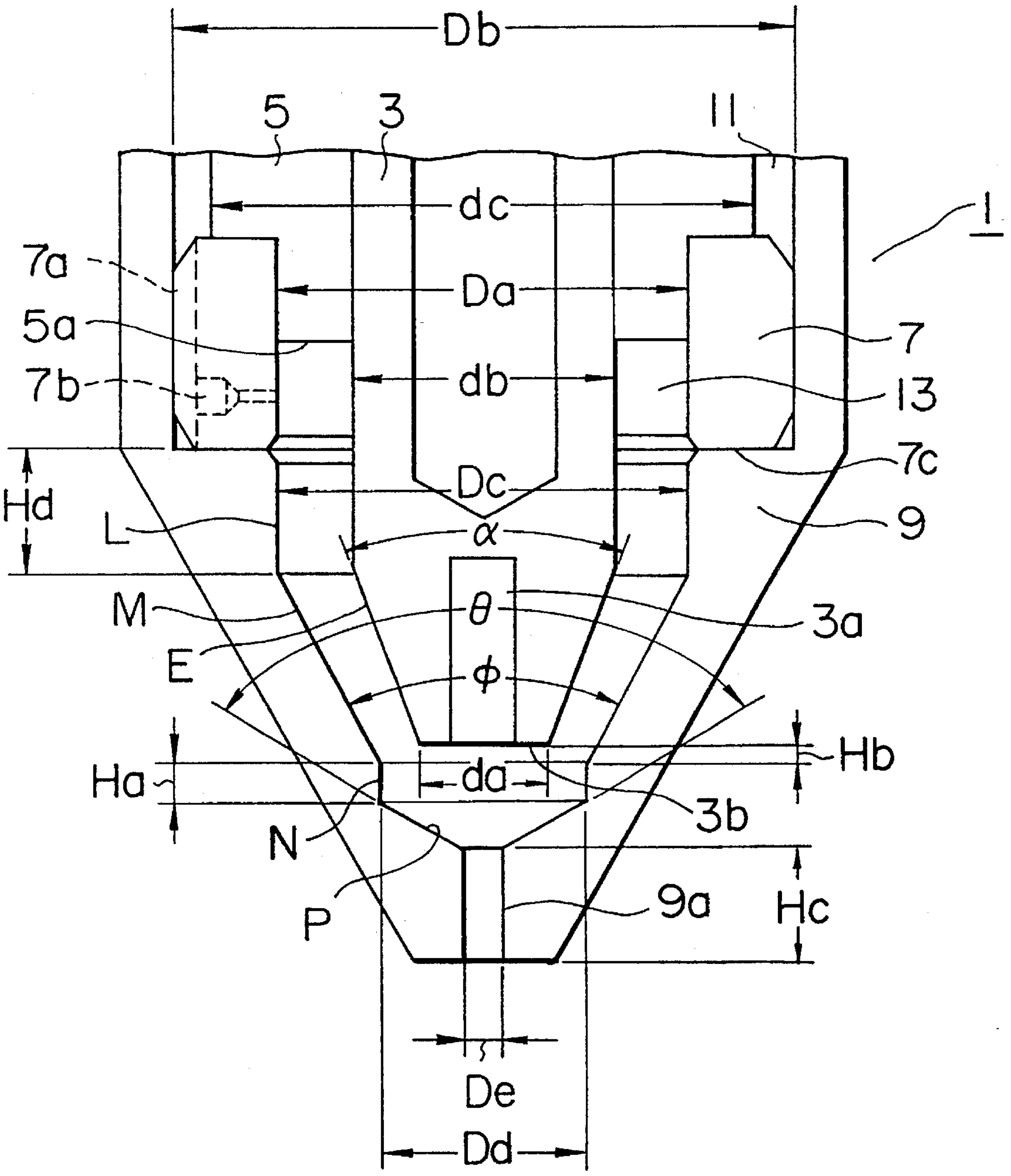
FIG. 1*b* illustrates reference characters denoting the dimensions, etc., of FIG. 1*a;*

FIG. 1*a* is a cross-sectional view of the nozzle front end of a plasma torch, while FIG. 1*b* shows reference characters designating the dimensions, etc., of FIG. 1*a*. An electrode 3 is provided at the axial center of a plasma torch 1. An insulation member 5 is provided concentrically to and outwardly of the electrode 3, and a swirler member 7 and a nozzle 9 are provided outwardly of the insulation member and concentrically to the electrode 3.

The electrode 3 is a conductive member of, for example, copper. The electrode member 3*a,* made of hafnium, tungsten, silver, or the like, is embedded in the substantially central part of the front end of the electrode 3. The lower end 3*b* of the electrode 3 is a plane section having a diameter da, which is greater than the outer diameter of the electrode member 3*a.* A tapered section E (taper angle $\alpha$) extends upwardly from the lower end of the electrode 3 toward an electrode outer diameter db.

The insulation member 5 is made of an insulation material, such as ceramic, and electrically insulates the electrode 3 from the nozzle 9. The inner peripheral face of the insulation member 5 is tightly fitted to a portion of the electrode 3 having the outer diameter db, and the outer peripheral face of the lower portion of the insulation member 5 has a swirler member 7 of inner diameter Da fitted tightly thereto. A supply gas passage 11 is formed between the outer periphery of the portion of the insulation member 5 having an outer diameter dc and the inner periphery of the portion of the nozzle 9 having an inner diameter Db. A gas passage 13 is formed from the swirler member 7 and below a lower end 5*a* of the insulation member 5.

Figure 2:
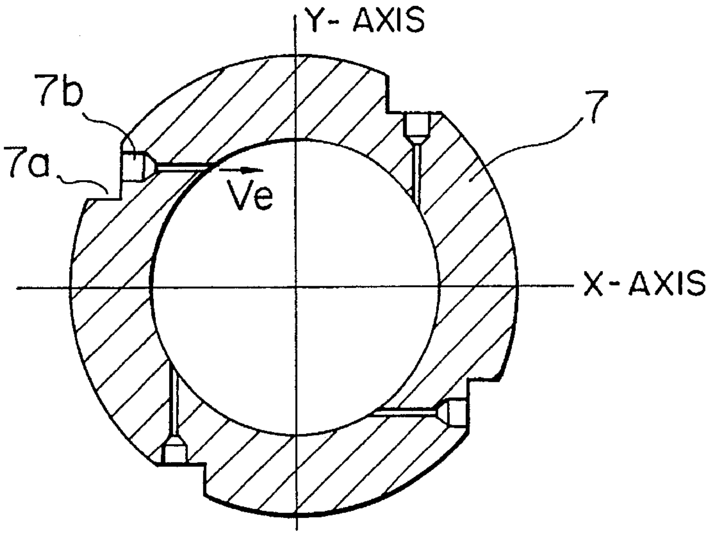
FIG. 2 illustrates swirling currents of operating gas flowing from the swirler member of FIG. 1*a;*

The swirler member 7 is formed of a material having excellent high-temperature resistance and processability, such as free-cutting steel and copper. The inner peripheral face is tightly fitted to the insulation member 5, and the outer peripheral face is tightly fitted to the inner peripheral face of the nozzle 9 which has an inner diameter Db. The outer periphery of the swirler member 7 has formed therein gas path slits 7*a* at two or more places at equal distances apart along the circumference. In addition, holes 7*b,* serving as ejection holes, are formed therein at equal distances apart, extending from the slits 7*a* toward the inner peripheral dimension, as shown in FIG. 2, and being substantially tangential with respect to the annular supply gas path 13 in a plane (the X–Y plane in FIG. 2) which is substantially perpendicular to the longitudinal axis. Although in this embodiment the outer periphery of the swirler member 7 is slightly cut to form a path, it is noted that the axial center of the holes 7*b* is not more than ±5°, and preferably not more than ±3° in the vertical dimension (vertical dimension in FIG. 1*a*). The holes 7*b* are formed below the lower end 5*a* of the insulation member 5.

The nozzle 9 is formed of conductive material such as an iron-containing material, a copper-containing material, and a stainless steel. The inner peripheral face with the inner diameter Db has the outer peripheral face of the swirler member 7 tightly fitted thereto, with one end face 7*c* of the swirler member 7 being in contact with the nozzle 9. The upper portion of the nozzle 9 is connected to a plate (not illustrated), and is removably secured with screws, etc., to the torch body (not illustrated). The inner face of the nozzle 9 having the diameter Dc, which is substantially equal to the inner diameter Da of the swirler member 7, is nearly parallel to the face of the electrode 3 having the outer diameter db, and the length of the parallel section is Hd. A cylindrically-shaped annular space, formed by the inner face of the nozzle 9 having the diameter Dc and the outer peripheral face of the electrode 3 having the diameter db, is called the entrance section L. It is noted that the outer peripheral face of the electrode 3 at the entrance section L can have a tapered lower outer diameter section. For example, it can have a tapered section E.

The nozzle 9 has a tapered section M, tapering downwardly and inwardly from the inner diameter Dc to the nozzle front end, which forms an angle $\phi$, which can be either nearly equal to or greater than the taper angle $\alpha$ of the electrode 3. Even below this tapered section M and near the electrode lower end 3*b* (distance in the axial center dimension), there is formed a cylindrical section (hereinafter referred to as the velocity reduction space N). The velocity reduction space N is concentric with the longitudinal axis of the electrode 3 and is cylindrical in shape with a diameter Dd, which is greater than the diameter da of the lower end 3*b* of the electrode 3, and with a height Ha, which is smaller than the diameter Dd. It is noted that, with regard to the distance Hb in the longitudinal axial dimension between the upper end of the cylindrical shape of the velocity reduction space N and the electrode lower end face 3*b*, while the lower end 3*b* of the electrode 3 is illustrated in FIG. 1*b* as being above the velocity reduction space N, the lower end 3*b* of the electrode 3 can be positioned in the velocity reduction space N. In this case, the velocity reduction space N has its upper end formed as a cylindrically annular shape.

A tapered section (hereinafter referred to as the acceleration space P) tapers downwardly and inwardly from the diameter Dd of the velocity reduction space N at an angle $\theta$, and the tapered section merges into a nozzle orifice formed at the end of the nozzle 7 and having a diameter De. A predetermined size is selected for the nozzle orifice diameter De in accordance with the material of the workpiece, the thickness of the workpiece, the cutting width precision, etc. The length Hc of the nozzle orifice having the diameter De is also selected in the same way. Hereafter, the nozzle orifice 9*a* is defined by both the orifice diameter De and the orifice length Hc.

With each of the components arranged in the above-described manner, the operating gas takes the path summarized below. It flows from the annular entrance section L, having almost parallel cylindrical walls formed by the outer periphery of the electrode 3 and the inner periphery of the swirler member 7 and the nozzle 9, and then downwardly through the thin conically annular acceleration section (hereinafter referred to as the acceleration section M), which has tapered inner and outer faces formed by the tapered section E of the electrode 3 and the tapered section M of the nozzle 9, and which is connected to the entrance section L at a gentle angle. The operating gas then reaches the cylindrically shaped velocity reduction space N, formed at the end of the acceleration section M and near the lower end 3*b* of the electrode. After having flowed into the velocity reduction space N, the operating gas passes down through the acceleration space P, located below the velocity reduction space N, then through the nozzle restriction section 9*a*, formed as a cylindrical shape at the front end of the nozzle 9, and is ejected to a workpiece (not illustrated) in the form of an arc jet. Although, in the above-described construction, examples of materials for each of the component members were given, they are not to be construed as limitative.

A description will be given of the operation of the plasma torch i having the above-described construction. The operating gas flows from the supply gas path 11, formed between the outer diameter dc of the insulation member 5 and the inner diameter Db of the nozzle 7, and then through the slits 7*a* of the swirler member 7, through the holes 7*b*, formed in the swirler member 7 at equal distances apart, and through the gas path 13, located inwardly of the gas path 11. As shown in FIG. 2, the gas, flowing out from the plurality of equal holes 7*b*, flows as jets in the form of tangential swirlers, having only a tangential velocity component $V\theta$. The tangential swirlers, which pass from the gas path 13 to the entrance section L, become uniform swirling currents of operating gas, and flow downwardly into the acceleration section M, connected to the entrance section L at a gentle angle. The swirling currents, accelerated in the acceleration section M, flow into the velocity reduction space N, formed near the lower end 3*b* of the electrode 3. In the velocity reduction space N, the arc jet (hereinafter referred to as the arc column) is stably held with respect to the electrode axis, using the low pressure gradient of the swirling central portion symmetrical to the axis, generated by the swirling current produced by the tangential swirler; that is, the pressure gradient symmetrical to the axis produced by the centrifugal force of the current swirling velocity component (becomes minimum on the center axial line). Here, in the velocity reduction space N, as the path area increases, the axial velocity component decreases, while the swirling velocity component, which does not decrease, remains at an appropriate value, so that it is possible to create the necessary steep pressure gradient symmetrical to the axis to stably maintain the arc column. Since the velocity reduction space N has a large diameter Dd, the distance between the outer edge of the arc column (current boundary) and the velocity reduction space N wall is large, which results in an increased gas insulation layer thickness, so as to increase resistance to double arc and thus restrict the generation of double arcs. This increases the durability of the plasma torch.

The operating gas is gradually accelerated within a short distance and narrowed down from the velocity reduction space N to the next acceleration space P, so that the arc column, maintained with respect to the electrode axis in the velocity reduction space N, is narrowed down and flows into the nozzle restriction section 9*a*. In the nozzle restriction section 9*a*, the operating gas becomes a predetermined arc jet and travels a short distance from the electrode 3 to the workpiece. Accordingly, a shorter distance from the lower end 3*b* of the electrode 3 to the entrance of the nozzle restriction section 9*a* causes the arc column to be maintained at a shorter length, thus reducing the occurrence of various instabilities of the arc column formed in the current, such as arc column wandering.

A description will be given of experiments performed on the plasma torch 1 in accordance with the present invention, described in detail above, and the conventional plasma torch 60 proposed by the present inventor.

EXPERIMENTAL EXAMPLE 1: Dross Adhesion Height

Figure 3:
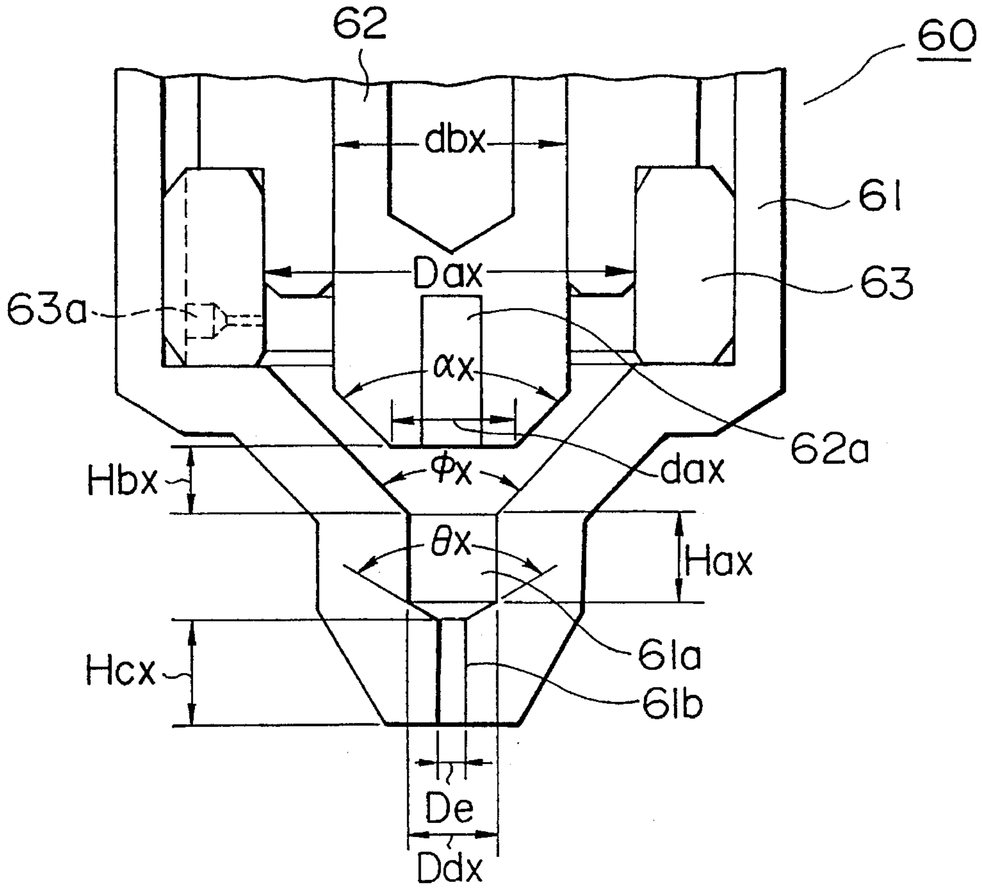
FIG. 3 PRIOR ART
FIG. 3 illustrates reference characters designating the dimensions, etc., of the nozzle front end of the conventional plasma torch of FIG. 8.
Figure 8:
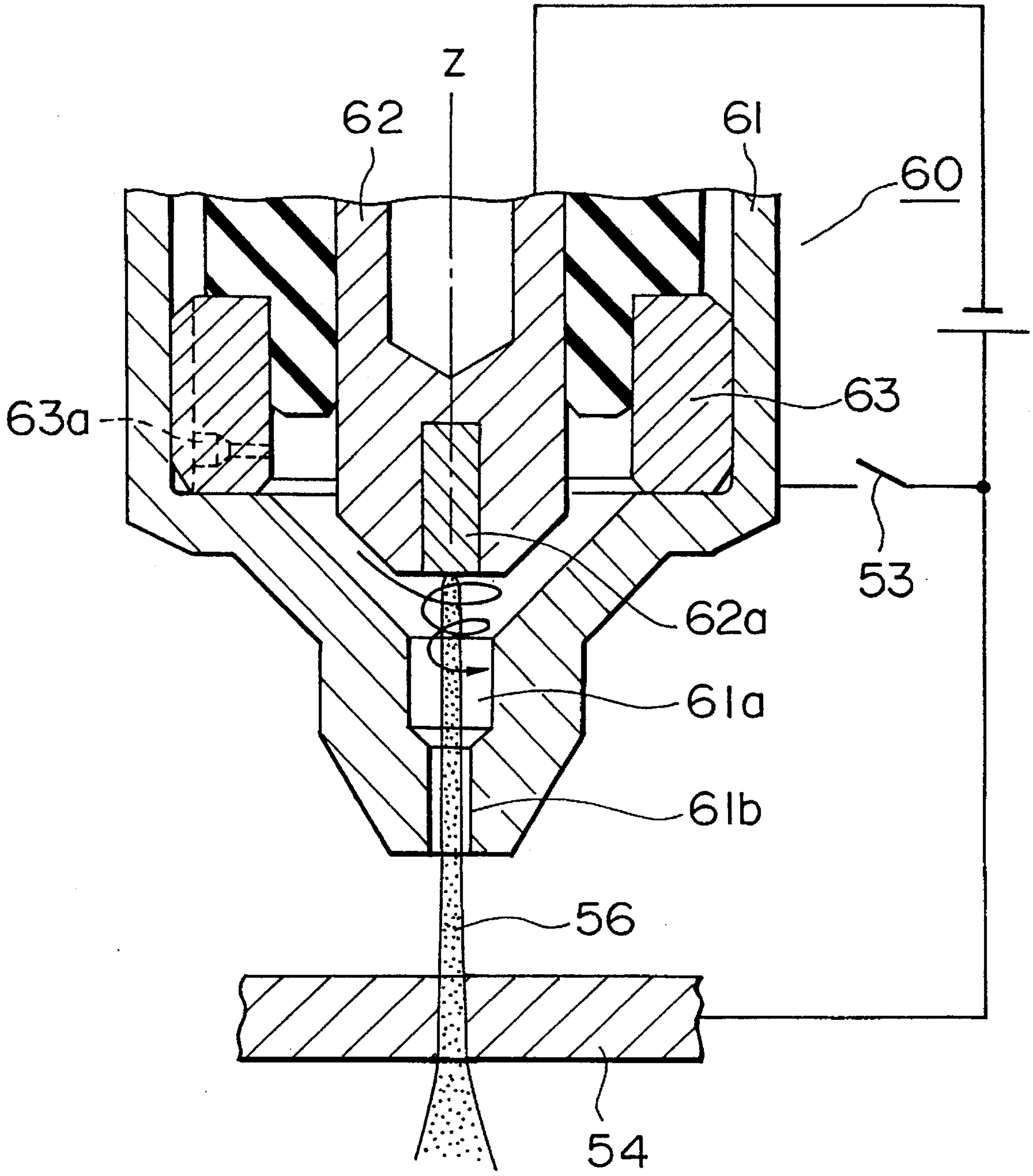
FIG. 8 PRIOR ART
FIG. 8 is a cross-sectional view of the nozzle front end of another conventional plasma torch.

In this experiment, swirling currents were generated and the conventional plasma torch 60 having the velocity reduction space 61*a* (see FIG. 8) was used to examine the dross adhesion height when changes were made in the operating gas flow rate and the cutting velocity. This experiment was conducted to show that, in the case of the conventional plasma torch with a nozzle and an electrode, it is difficult to increase the energy density I/m of the arc jet since the double arc generation limiting current is small; and it is particularly necessary to increase the energy density I/m of the arc jet when cutting steel plates using a plasma torch utilizing transferred arc jets, so that it is even more difficult to perform cutting in the free dross state; and to make clear the state of dross adhesion, etc., in the energy density I/m regions of the arc jet at which cutting is not conventionally performed. FIG. 3 shows reference characters designating dimensions, etc., in the plasma torch 60. The same component parts are given the same reference characters, and will not be described below.

(1) Principal dimensions in the plasma torch 60 used in the experiment:

Outer diameter $db_x$ of electrode 62=5.5 mm

Diameter $da_x$ of lower end of electrode 62=2.7 mm

Taper angle $\alpha_x$ of electrode 62=90°

Inner diameter $Da_x$ of swirler member 63=8.5 mm

Length corresponding to parallel section length Hd of plasma torch 1=0 mm

Diameter $Dd_x$ of velocity reduction space 61*a*=2.0 mm

Height $Ha_x$ of velocity reduction space 61*a*=1.5 mm

Nozzle 61 angle $\theta_x$ nozzle 61 below velocity reduction space 61*a*=120°

Nozzle 61 angle $\phi_x$=90°

Nozzle 61 orifice diameter De=0.8 mm

Distance $Hb_x$ between lower end of electrode 62 and velocity reduction space 61*a*=1.3 mm Length $Hc_x$ of nozzle restriction section 61*a*=2.6 mm (2) Cutting conditions:

Arc current value I=37 A

Type of operating gas=oxygen

Figure 4:
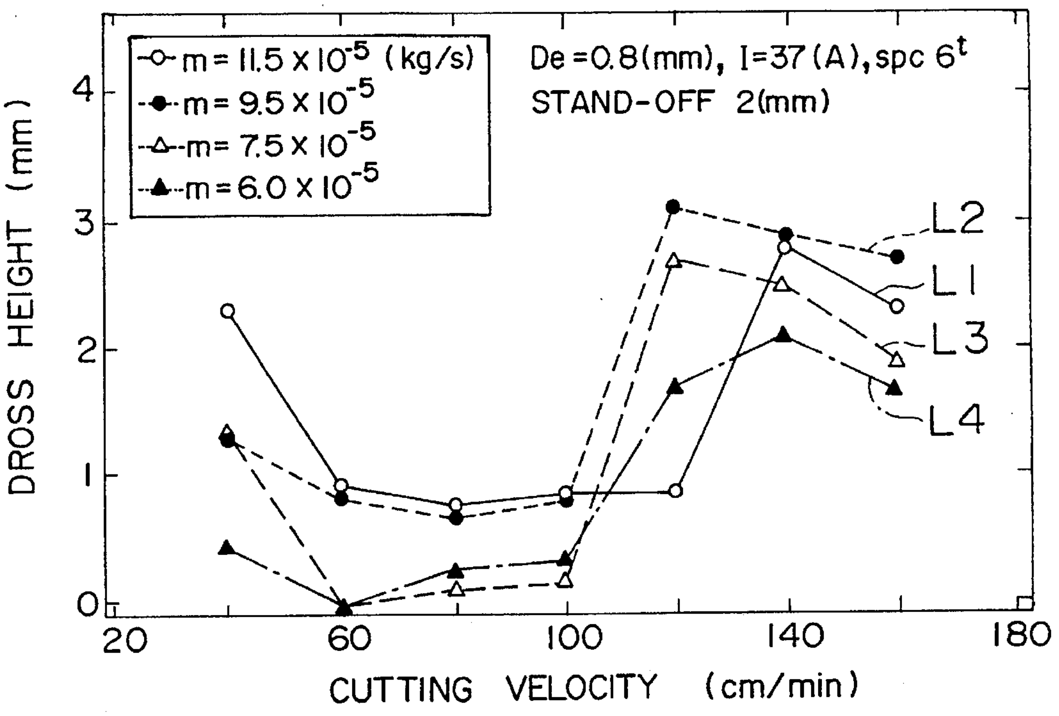
FIG. 4 shows experimental results of the dross adhesion height when changes are made in the operating gas flow rate and the cutting velocity.

Operating gas flow rate m (following four values)
=$11.5\times10^{-5}$ kg/S (Line L1 of FIG. 4)
=$9.5\times10^{-5}$ kg/S (Line L2 of FIG. 4)
=$7.5\times10^{-5}$ kg/S (Line L3 of FIG. 4)
=$6.0\times10^{-5}$ kg/S (Line L4 of FIG. 4)

Stand-off=2 mm

Workpiece=Soft steel plate

Plate thickness=6 mm (3) Experimental results:

The results of this experiment are shown in FIG. 4. In this experiment dross adhesion was observed in the L1 and L2 regions, that is the regions having a small energy density I/m, where a large amount of a conventional operating gas was used. It was found that in the line L4 (energy density I/m=$6.2\times10^5$ (A·S/kg)] and the line L3 [energy density I/m=$4.9\times10^5$ (A·S/kg)] regions where a small amount of operating gas was used, that is, where energy density I/m was large, it is possible to perform cutting in a dross free state. However, although only small amounts of dross adhesion occurred at a cutting velocity of 60~100 cm/min, this depends on the plate thickness, current value, etc. The inventors have found out from many experimental results that when the energy density I/m is larger than approximately $4\times10^5$ (A·S/kg), it is possible to achieve cutting in a free dross state. However, the inventors have also found out that when cutting is performed successively for a large number of times, double arc occurs and that, as will be described below, durability of the plasma arc is decreased.

EXPERIMENTAL EXAMPLE 2: Number of cumulative occurrences of double arcs

The double arc occurrence conditions and dross adhesion were checked using the plasma torch 1 of FIG. 1*b*, which is a plasma torch of the present invention. Cutting (described later) was performed with three nozzles 9 having the same shape. The conventional plasma torch 60 having the same dimensions as those of the plasma torch used in the aforementioned first experimental example was used, except that the nozzle orifice diameter De was 0.6 mm.

(1) Principal dimensions in the plasma torch 1 used in the experiment:

Diameter da of lower end 3*b* of electrode=2.7 mm

Outer diameter db of electrode 3=5.5 mm

Taper angle α=40°

Inner diameter Dc of nozzle 9=8.5 mm

Length Hd of entrance section L=2.7 mm

Diameter Dd of velocity reduction space N=4 mm

Height Ha of velocity reduction space N=0.6 mm

Angle θ of acceleration space P=120°

Angle ϕ of acceleration section m=60°

Nozzle orifice diameter De=0.6 mm

Length Hc of nozzle restriction section 9*a*=2.0 mm (2) Cutting conditions (same for both plasma torch 1 and plasma torch 60):

Arc current value I=27 A

Energy density I/m=$6.5\times10^5$ A·S/kg

Stand-off=2 mm

Type of operating gas=oxygen

Workpiece=Soft steel plate

Figure 5:
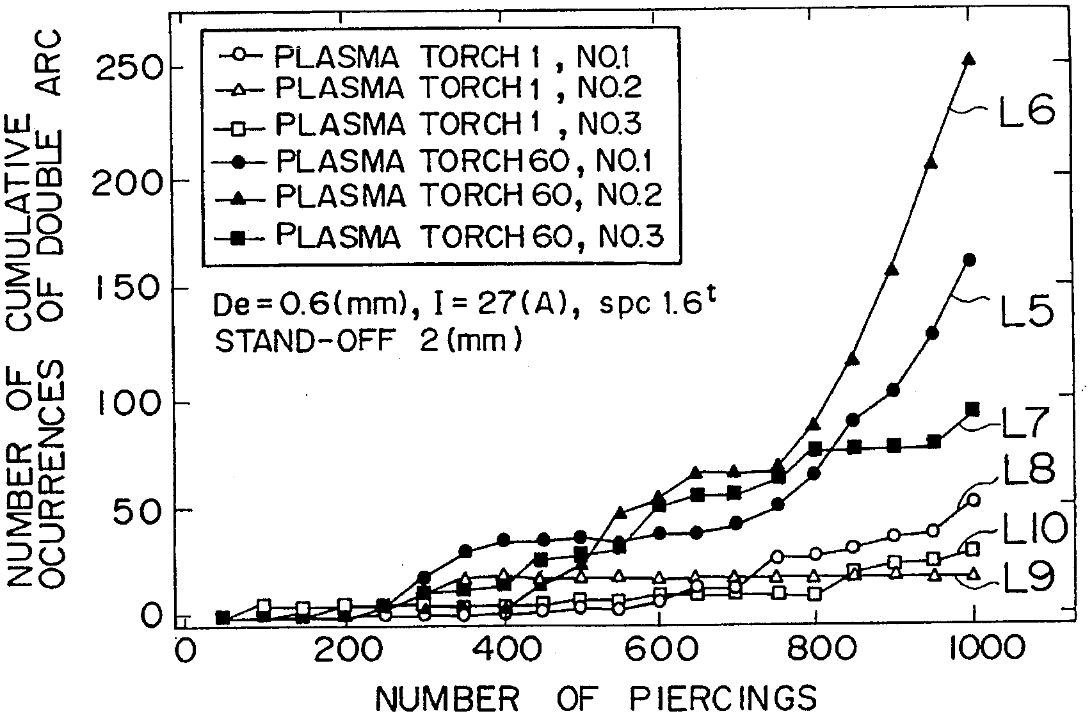
FIG. 5 illustrates experimental results of the number of double arc cumulative occurrences.

Plate thickness=1.6 mm (3) Experimental results:

Piercing was started to perform a 10-cm straight cut and this was repeated for 1000 times, and the number of cumulative occurrences of double arcs were examined. The double arc occurrences were measured from changes in the input voltage values, while dross adhesion was visually measured. FIG. 5 shows the relationship between the number of piercings and the number of cumulative occurrences of double arcs.

Experimental results showed that when the conventional plasma torch 60 was initially used, dross adhesion did not occur. However, when the number of cutting operations approached 600 times, double arcs cumulatively occurred 50 times, so that slight dross adhesion was observed. When the number of cutting operations exceeded 800 times, the occurrences of double arcs increased rapidly, so that a large amount of dross adhesion was observed. From the many experimental results, the present inventors confirmed that when the energy density I/m is greater than approximately $4\times10^5$ A·S/kg, cutting in a dross free state is achieved. However, the inventors also found that when the cutting is repeated for a large number of times, double arcs as well as large amounts of dross adhesion were observed, with reduced durability of the plasma torch.

The experimental results showed that when the plasma torch 1 of the present invention was used, double arcs occurred cumulatively only about 50 times when the cutting operations were repeated for 1000 times, as shown by lines L8, L9, and L10. In this case, no dross adhesion was observed on the cut section. Compared to the conventionally-constructed plasma torch, even when the same energy density I/m is applied, the plasma torch of the invention has more power to stably maintain the arc column with respect to the electrode axis, so that even when the operating gas flow rate is small at approximately $4.2\times10^{-5}$ kg/S, there is less instability of the arc column, and cutting can be stably performed for a long period of time without dross adhesion, that is in a dross free state.

EXPERIMENTAL EXAMPLE 3: Dross adhesion height with various nozzle diameters

Figure 6:
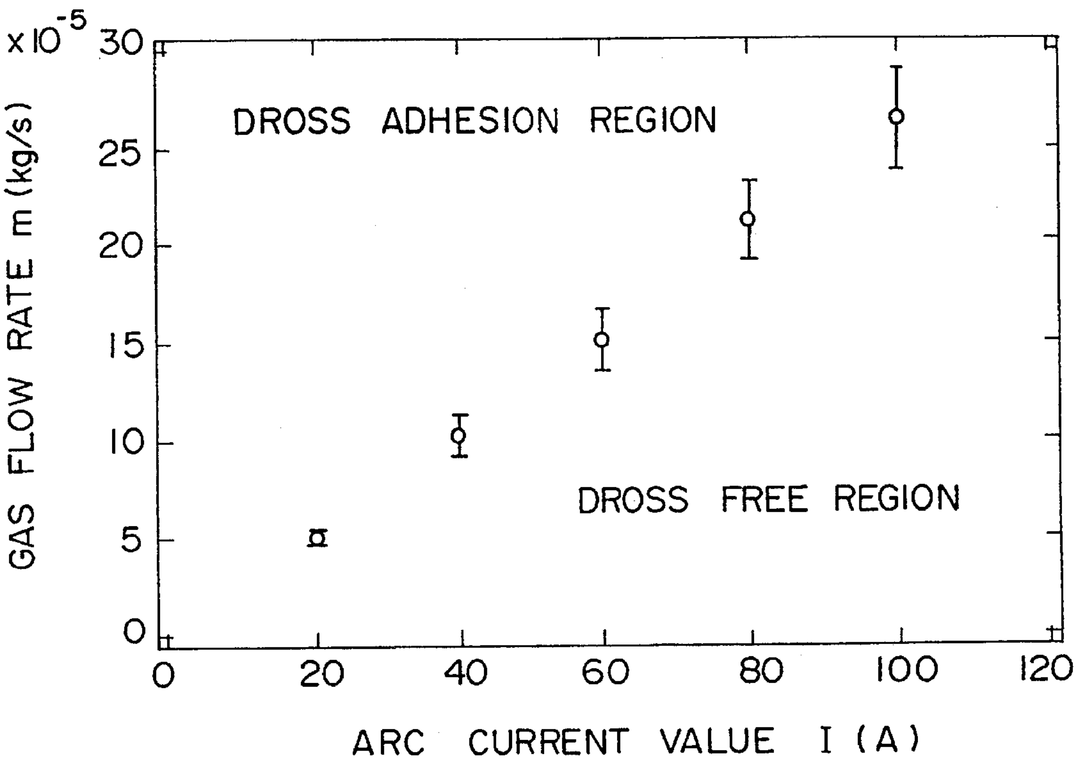
FIG. 6 shows experimental results of the dross adhesion height when various changes are made in the diameter of the nozzle in the present invention.
Figure 7:
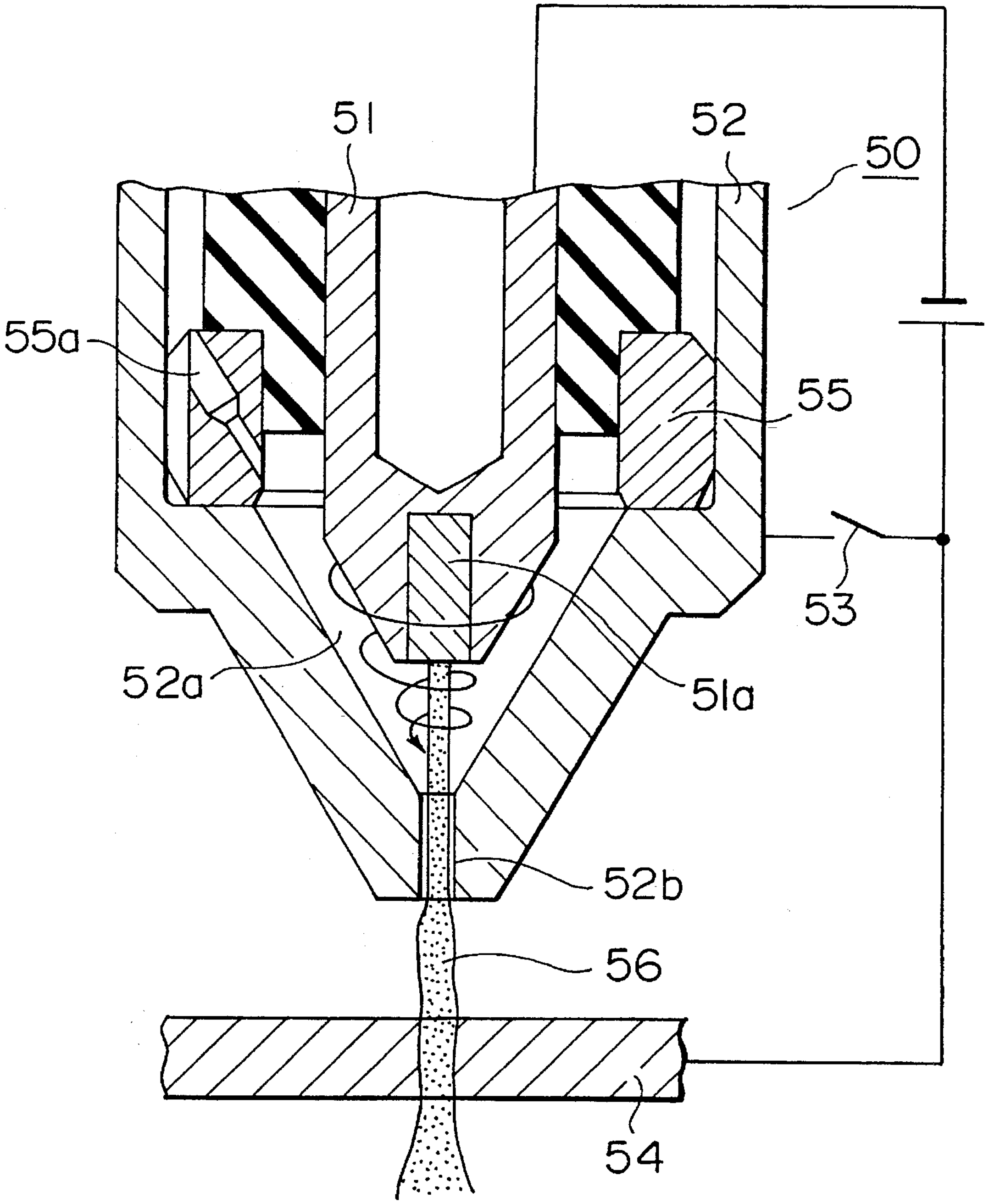
FIG. 7 PRIOR ART
FIG. 7 is a cross-sectional view of the nozzle front end of a conventional plasma torch.

FIG. 6 illustrates the experimental results. FIG. 6 is a graph showing the relationship between gas flow rate and current allowing cutting where no dross adhesion height is visually measured or allowing cutting in a dross free state, when changes are made in the cutting current using various nozzle orifice diameters De in the plasma torch of the present invention. The figure shows that, for example, when the arc current value I is 40 A, the operating gas flow rate m limit allowing cutting in a dross free state is approximately $10\times10^{-5}$ kg/s (represented by O in the figure), while in regions where the flow rate is less than this value, it is possible to perform cutting in a dross free state.

From this experiment, the limit value of energy density I/m=$4\times10^5$ A·S/kg. This means that the dross free region is located where the energy density I/m is greater than this limit value.

EXPERIMENTAL EXAMPLE 4: Cutting velocity measurement

In the experiment, the plasma torch 1 of the present invention and the conventional plasma torch 60 were used to examine the cutting velocities allowing cutting in a dross free state. The main conditions were a workpiece plate thickness of 1.6 mm, a nozzle orifice diameter De of 0.6 mm, an arc current value I of 27 A, oxygen as operating gas, and an operating gas flow rate at which the energy density I/m is greater than $4\times10^5$ A·S/kg. Cutting at various velocities revealed that the dross free region of the plasma torch 1 was approximately 100~190 cm/min, while the dross free region of the plasma torch 60 was approximately 100~155 cm/min. This means that at the region where I/m≧$4\times10^5$ A·S/kg, it is possible to perform cutting in a dross free state, while, at the same time, the cutting velocity is a practical velocity, with the plasma torch 1 of the present invention being about 1.23 times faster than the conventional ones.

EXPERIMENTAL EXAMPLE 5: Measurement by enlarged plasma torch model

This experiment was conducted to find out preferable dimensions and shapes for the plasma torch 1 of the present invention. Accordingly, to find out the relationship of plasma torch shape and the swirling current strength and uniformity, plasma torches of a model having five times the dimensions of the plasma torch 1 were manufactured for various standards to measure the static pressure at each of the points in the torch interior where operating gas flows. The reference characters, etc., of the present plasma torch is the same as those of the plasma torch 1, so that they will not be described here.

(1) Common dimensional forms of plasma torches and gas flow rate:

Nozzle orifice diameter De=3.0 mm

Length Hc of nozzle orifice=3De

Operating gas (oxygen) flow rate $9.5\times10^{-4}$ kg/S (2)

(2) Measurement position of static pressure in plasma torch interior:

Center of lower end 3*b* of electrode (static pressure at this position called Pe)

Wall face of lower portion of velocity reduction space N (static pressure at this position called Pvr)

Figure 9:
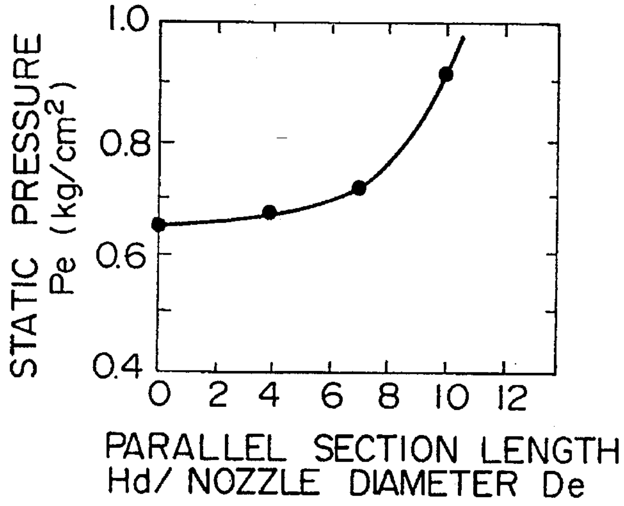
FIG. 9 shows experimental results of the relationship between parallel section length/nozzle diameter and static pressure in the present invention.
Figure 10:
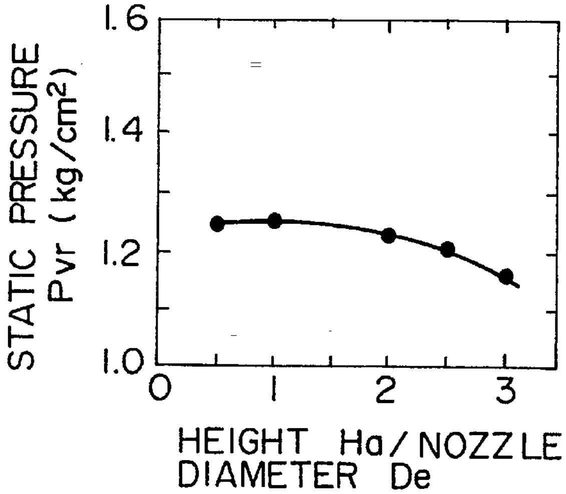
FIG. 10 shows experimental results of the relationship between velocity reduction space height/nozzle diameter and static pressure in the present invention.

(3) Experimental results:

The experimental results were as follows:

a) FIG. 9 shows the relationship between the (parallel section length Hd of entrance section L/nozzle diameter De) and the static pressure Pe, where the height Ha of the velocity reduction space N=nozzle orifice diameter De, the distance Hb between the lower end 3*b* of the electrode and the velocity reduction space N is 0, and the diameter Dd of the velocity reduction space N=7 De. Since centrifugal force acts upon the operating gas, which is a fluid, swirling currents with a larger swirling velocity component $V_\theta$ (see FIG. 2) causes a lower static pressure Pe at the lower end 3*b* of the electrode 3. From the many experimental results described above, it is preferable that the static pressure Pe be not more than about 0.7 kg/cm$^2$, so that the preferable range of the parallel section length Hd of entrance section L/nozzle orifice diameter De is 0≦Hd/De≦7.

b) The relationship between the angle ϕ of acceleration section M and the static pressure Pe, when, for example, Ha=De, Hb=0, and Dd=7 De as in the aforementioned a). The results showed that the angle ϕ at which the static pressure Pe equals the same desirable value as in the aforementioned a) of not more than about 0.7 kg/cm$^2$ falls in the range of 30°≦ϕ≦100°.

c) A desirable angle θ acceleration space P was selected to maintain the stability of the arc jet. More specifically, when θ<90°, the length from the bottom face of the velocity reduction space N to the nozzle restriction section 9*a* becomes too long, so that the arc jet becomes more unstable. On the other hand, when θ>150°, the operating gas is rapidly accelerated to the nozzle restriction section 9*a*, so that the flow often becomes unstable. Therefore the angle θ is preferably in the range of 90°≦θ≦150°.

d) FIG. 10 shows the relationship between the (height Ha of velocity reduction space N/nozzle orifice diameter De) to the static pressure Pvr of the wall at the lower portion of the velocity reduction space N. The graph shows the result when the distance Hb=0 and the diameter Dd=7 De. A higher static pressure Pvr value forms a more effective pressure distribution at the lower face of the velocity reduction space N. The static pressure Pvr is preferably greater than about 1.2 kg/cm$^2$ for it to exist in an extremely stable state. Therefore, although an appropriate Ha/De value would be Ha/De≦2.5, since when Ha/De<0.5 a proper discharge gap cannot be obtained, it is preferably in the range of 0.5≦Ha/De≦2.5.

e) Examination of the relationship between the (diameter Dd/nozzle orifice diameter De) and the static pressure Pe showed that a desirable static pressure Pe value can be obtained, that is, the center of the arc jet in the plasma torch enters an effective low pressure space when Dd/De lies within the preferable range of 4≦Dd/De≦10.

f) Experiments were carried out, under the condition that the height Ha=the nozzle diameter De and the diameter Dd=7 De, to obtain a preferable distance Hb between the lower end 3*b* of the electrode 3 and the velocity reduction space N. Examination of the relationship between the (distance Hb/nozzle diameter De) and the static pressure Pe revealed that the preferable static pressure is obtained when it lies within the preferable range of −0.4≦Hb/De≦0.6.

EXPERIMENTAL EXAMPLE 6: Measurement by plasma torch 1

Figure 11:
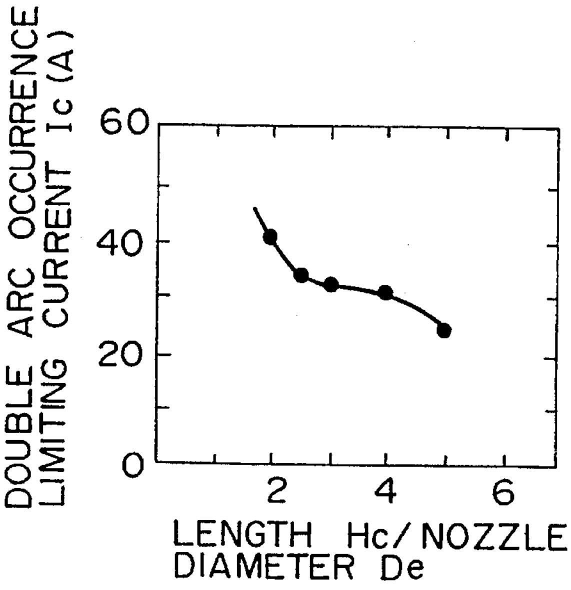
FIG. 11 illustrates experimental results of the relationship between the nozzle diameter length/nozzle diameter and the double arc occurrence limiting current in the present invention.

The experiment was conducted to obtain preferable dimensions as regards the length Hc of the nozzle orifice of the plasma torch 1 of the present invention. FIG. 11 shows the relationship between (length Hc of nozzle diameter De/nozzle orifice diameter De) and the double arc occurrence limiting current Ic. In this case, the nozzle diameter De=0.6 mm and the operating gas used was oxygen. From various experiments, it can be thought that (length Hc/nozzle diameter De) value of not more than 4 is appropriate to obtain the required double arc occurrence limiting current Ic of, for example, about 30 A or more. However, when Hc/De<2.5, the arc jet cannot be sufficiently contracted by the thermal pinch effect, which means that good cutting quality cannot be obtained. Therefore, the preferable range is 2.5≦Hc/De≦4.

With the constructions in Examples 5 and 6, the plasma torch 1 allows cutting in a dross free state, and, at the same time, it can be designed based on a wide range of dimensional forms, when necessary.

INDUSTRIAL APPLICABILITY

The present invention is effective in that it provides a plasma torch capable of cutting in a dross free state, made possible by increased energy density of the arc jet, and of an operation efficiency which is not reduced even with a low operating gas flow rate since it can stably maintain the arc jet in the plasma torch, and which has high double arc resistance and high durability.

What is claimed is:

1. A plasma torch comprising:

an electrode having a longitudinal axis, an upper portion, an intermediate portion, a lower portion, and a lower end face, said lower end face having a diameter da;

an annular nozzle body having an upper portion, an intermediate portion, and a lower portion, said nozzle body being positioned coaxially with and about said electrode so as to form an annular entrance section between said intermediate portion of said nozzle body and said intermediate portion of said electrode and to form an annular tapered section between said intermediate portion of said nozzle body and said lower portion of said electrode;

an annular swirler member positioned coaxially with said electrode between said upper portion of said electrode and said upper portion of said nozzle body to form an annular gas passage between said swirler member and said electrode;

an annular insulating member positioned coaxially with said electrode between said upper portion of said electrode and said swirler member;

said swirler member having a plurality of ejection holes formed therein in a plane substantially perpendicular to said longitudinal axis, said ejection holes extending approximately tangential to said annular gas passage to generate jets therein with a swirling velocity component;

wherein said lower portion of said nozzle body has a nozzle orifice formed therein opening to an exterior of said nozzle body, said nozzle orifice having a diameter De and an axial length Hc;

wherein said lower portion of said nozzle body has a velocity reduction space formed therein between said electrode and said orifice and below said annular tapered section;

wherein said velocity reduction space is in the form of a cylindrically shaped space which is coaxial with said longitudinal axis and which has a diameter Dd and an axial height Ha;

wherein said diameter Dd of said velocity reduction space is greater than said diameter da of said lower end face of said electrode; and wherein said diameter Dd of said velocity reduction space is greater than said axial height Ha of said velocity reduction space.

2. A plasma torch in accordance with claim 1, wherein a ratio of Dd/Ha is at least 4/0.6.

3. A plasma torch in accordance with claim 1, wherein a ratio of Dd/da is at least 4/2.7.

4. A plasma torch in accordance with claim 3, wherein a ratio of Dd/Ha is at least 4/0.6.

5. A plasma torch in accordance with claim 1, wherein said axial height Ha of said velocity reduction space is in the range of 0.5De to 2.5De.

6. A plasma torch in accordance with claim 1, wherein said diameter Dd of said velocity reduction space is in the range of 4De to 10De.

7. A plasma torch in accordance with claim 1, wherein an axial distance Hb between said lower end face of said electrode and an upper end of said velocity reduction space is in the range of —0.4De to 0.6De.

8. A plasma torch in accordance with claim 1, wherein said axial length Hc of said nozzle orifice is in the range of 2.5De to 4De.

9. A plasma torch in accordance with claim 1, wherein an axial length Hd of said entrance section is in the range of 0 to 7De.

10. A plasma torch in accordance with claim 1, wherein said intermediate portion of said nozzle body which forms said annular tapered section has a taper angle $\phi$ which is in the range of 30° to 100°.

11. A plasma torch in accordance with claim 1, wherein said nozzle body has a conical acceleration section converging downwardly and inwardly from said velocity reduction space to said nozzle orifice, and wherein said conical acceleration section has a taper angle $\theta$ which is in the range of 90° to 150°.

12. A plasma torch in accordance with claim 11, wherein said intermediate portion of said nozzle body which forms said annular tapered section has a taper angle $\phi$ which is in the range of 30° to 100°.

13. A plasma torch in accordance with claim 1, wherein said axial height Ha of said velocity reduction space is in the range of 0.5De to 2.5De;

wherein said diameter Dd of said velocity reduction space is in the range of 4De to 10De;

wherein an axial distance Hb between said lower end face of said electrode and an upper end of said velocity reduction space is in the range of –0.4De to 0.6De;

wherein said axial length Hc of said nozzle orifice is in the range of 2.5De to 4De;

wherein an axial length Hd of said entrance section is in the range of 0 to 7De;

wherein said intermediate portion of said nozzle body which forms said annular tapered section has a taper angle $\phi$ which is in the range of 30° to 100°;

wherein said nozzle body has a conical acceleration section converging downwardly and inwardly from said velocity reduction space to said nozzle orifice; and wherein said conical acceleration section has a taper angle $\theta$ which is in the range of 90° to 150°.

14. A plasma torch in accordance with claim 13, wherein a ratio of Dd/Ha is at least 4/0.6.

15. A plasma torch in accordance with claim 13, wherein a ratio of Dd/da is at least 4/2.7.

16. A plasma torch in accordance with claim 15, wherein a ratio of Dd/Ha is at least 4/0.6.

17. A plasma torch in accordance with claim 15, wherein said plasma torch provides an arc jet energy density greater than $4\times10^5$.

18. A plasma torch in accordance with claim 1, wherein said plasma torch provides an arc jet energy density greater than $4\times10^5$.

* * * * *